UNITED STATES PATENT OFFICE.

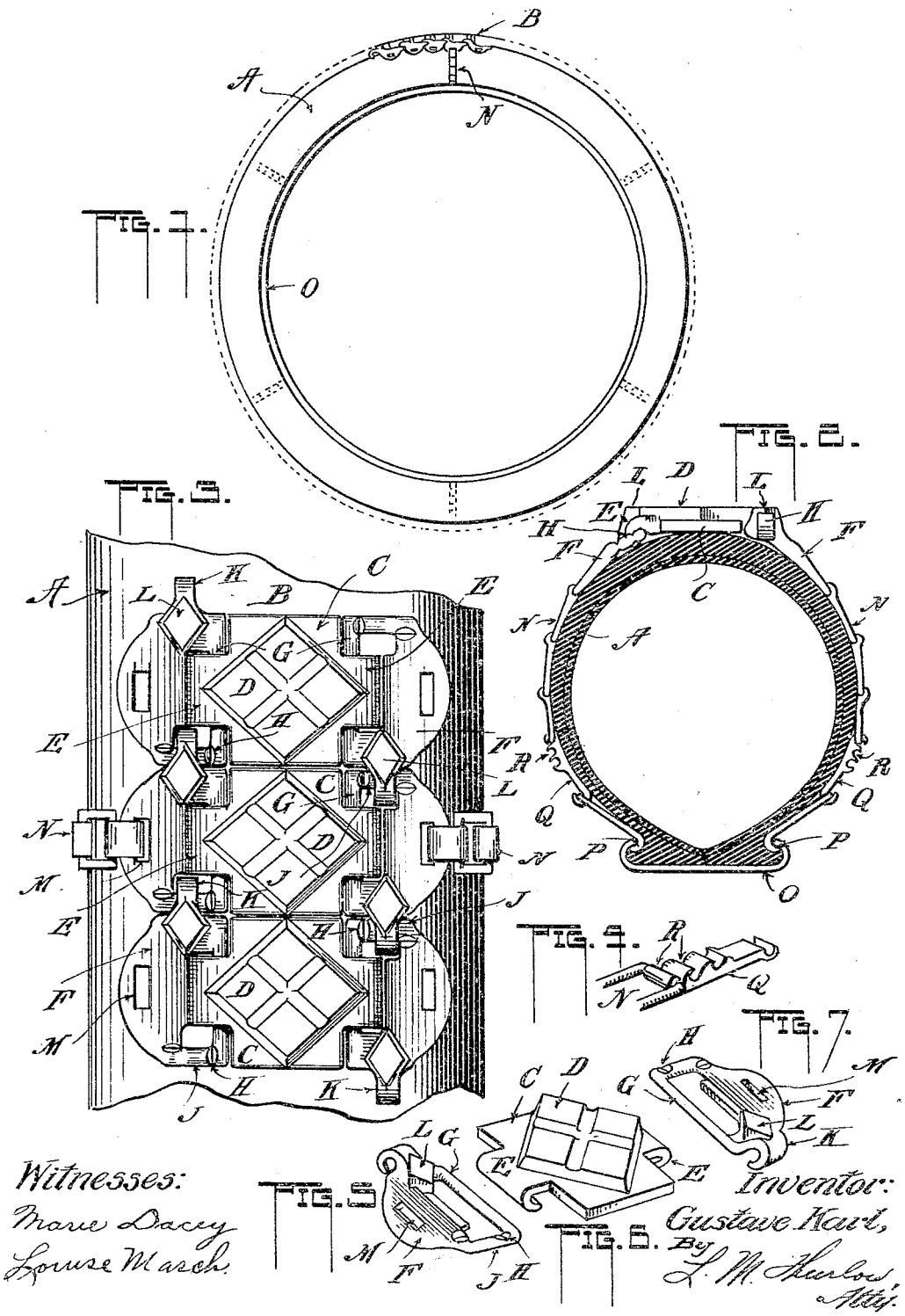

GUSTAVE KARL, OF PEORIA, ILLINOIS.

TIRE-PROTECTOR.

1,257,361.  Specification of Letters Patent.  Patented Feb. 26, 1918.

Application filed December 28, 1915. Serial No. 69,126.

*To all whom it may concern:*

Be it known that I, GUSTAVE KARL, a citizen of the United States, residing at Peoria, in the county of Peoria and State of Illinois, have invented certain new and useful Improvements in Tire-Protectors; and I do hereby declare that the following is a full, clear, and exact description of the invention, which will enable others skilled in the art to which it appertains to make and use the same.

This invention relates to a protecting armor for pneumatic tires and particularly to a flexible metal protector for the tread side of a tire for preventing punctures and to protect the said tread side from wear.

The invention has for one of its objects to provide for a protecting tread portion for a pneumatic tire, preferably made of metal, and which can be readily attached and detached and that will protect a tire against punctures and undue wear upon its face or tread, reduce the chance of blow-outs and therefore prolong the life and usefulness of said tire.

Another object is to provide a detachable protector for a tire forming a complete covering for the tread side of said tire, made up of a series of hingedly connected protecting portions so arranged as to yield separately under pressures imposed and sink into the tire so that the resiliency of said tire will not be impaired.

Another object is to provide for a tire a series of separate hingedly related members so constructed that they may be interlocked with one another and thus be permanently connected while in use on the tire without requiring separate fastening means.

Another object is to provide an armor for a pneumatic tire and a peculiar manner of securing the same upon the tire.

The invention also relates to certain details of construction as will be pointed out in the accompanying drawings forming a part of this application, in which, Figure 1 shows a tire and a portion of my improved armor shown in position thereon.

Fig. 2 is a cross section of the tire also showing an armor or protector and means for securing it in position.

Fig. 3 shows the face or tread portion of a tire and several of the parts of my improved armor or protector in place thereon.

Fig. 4 shows an adjusting member used in attaching the armor to the tire.

Figs. 5, 6 and 7 show certain separated link portions of the armor in perspective.

A represents the tire and B the armor or protector as a whole. Said armor or protector consists of a series of hingedly related members C to lie directly upon the tread portion of the tire, there being a series of such members lying in close order or with their edges abutting as shown in Fig. 3. They are preferably provided with raised portions D acting as road-engaging lugs that may be of any preferred form. The said members C are provided at two opposite sides with hook-extensions E clearly shown in Fig. 6, each of which engages a link F. The latter are shown by themselves in Figs. 5 and 7. Each has a spaced hinge portion G to receive the hooks E, said portions and hooks being assembled after the manner of the well known form of sprocket chain, that is to say, in certain positions of the parts relatively the hooks E can be engaged with the links by passing through notches H on the connecting portions J of said links F. When the latter and the members C lie in substantially the same plane it is not possible for them to become disengaged.

The said members and the links when assembled lie across the face of the tire or in a line substantially at right angles to a plane of the tire, all of the described parts lying in close order or substantially abutting against one another as already stated and all are connected to form an endless band of freely jointed members around the tire.

It is observed that the described links F each has at one end a hook K which engages said hinged portion J of an adjacent link F as shown in Fig. 3, the manner of engaging being the same as that described as to the hooks E and the hinged portions G. The links F, therefore, are connected with each other entirely around the tire at both sides of the members C.

The links are each provided with a lug L also in position to engage the road surface in the same manner as the lugs D described, their positions being staggered with respect to the said lugs D. In addition, the links are provided with holes M to receive the means by which the armor is secured in position on the tire. Said means may consist of any suitable flexible part. In the present instance I have shown, for example, chains N. One of these is attached to each of the opposite links F as shown in Fig. 3, and extends around the tire to the wheel rim indicated at O in Fig. 2, the terminal link of each chain having a hook end P to engage the edge of the said rim as shown in the figure last named, said rim in the present instance being of the "clencher" type. Where other forms of rims are used such as of the "quick detachable" any other means of securing the ends of the chains thereto may be resorted to.

In Fig. 4 I show a member of peculiar construction by which the chains may be adjusted in length whereby the armor or protector may be fitted to any size of tire. This consists of a link Q having a series of grooves R in any one of which one of the links of the chain may be engaged, the structure, of course, being such that there will be no possibility of accidental separation of the parts while in use. One of these members or links Q is preferably employed in each of the chains so that a proper adjustment of each may be obtained.

It is preferable in attaching the armor to have the tire partially deflated; then after said armor is in position, the tire is inflated to the proper degree, the armor being thus snugly held.

In use when one or more of the members C meets an obstruction the hinged relation of these parts permits them to sink into the tread of the tire so that the resiliency of the latter is not impaired, it being clear that since the movement is inward or toward the wheel center the length of the armor is rather decreased than increased thus readily permitting the hinging action of the parts relatively.

Since all of the links are provided with the described holes M for manufacturing reasons, as many of them as described may be used for the chains N although in practice it is found that but a small number of the chains is sufficient, for instance about six at each side.

I desire to make it clearly understood that it is not my intention to confine myself to the exact structure shown and described since slight changes in the arrangements of the linkage may be made without departing from the spirit of the invention and the meaning of the claims.

As will be seen my invention contemplates the use of a series of closely abutting members lying upon the tread side of a tire that will thoroughly protect said tire from wear by preventing contact thereof with the road surface and that will prevent sharp objects from cutting said tire or puncturing the air tube, the several said members directly interlocking with one another. A considerable portion of the tire at each side of the immediate tread is protected by the links F so that there will be little danger of punctures, and it is the desire and aim to use a series of small hingedly related parts each of which covers a comparatively small area of the tire so that the resiliency of the latter will not be impaired as when a large rigid part is used covering a considerable area of said tire which would reduce the resiliency very materially.

As distinguished from the art as known to me the series of members C, F, lie so close together that there is practically no exposed portion of the tire to receive objects likely to puncture its air tube because the several members are themselves interlocked in a close armor all of them being hooked together in close relation through their own integral parts.

The members are so placed, also, that each covers but a comparatively small area and each is free to move under pressure independently of its neighbor thereby in no way reducing the resiliency of the tire because of the separate small areas covered. Thus constructed the armor is exceedingly simple in construction and absolutely strong and indestructible so far as strain imposed thereon is concerned in use since all the parts are strongly linked together by their own integral hooks of large size, and the members cannot become separated except one be placed at an angle to the other to permit separation.

Having thus described my invention, I claim :—

1. In a tire protector, in combination, a series of abutting members whose abutting edges extend transversely of the tire, each member having an outwardly, downwardly and inwardly extending hook at each edge lying parallel to the plane of said tire, the hooks being spaced from one another, each being shorter than the member carrying it, and a series of links lying at each side of said series of members, each link adapted to enter endwise in one of the hooks and including a notch for permitting such engagement, all of said links abutting at their ends in line with the abutting edges of the members and filling the spaces between said hooks, and each said link having a hook at one end engaging the end of an adjacent link.

2. A protector for a pneumatic tire, comprising in combination, a series of members lying upon and extending around the tread of the tire in a single line and having abutting edges, their other opposite free edges each having a hook formed integrally therewith, and a series of links lying in a line at each side of the line of the members and engaging the hooks of the said members and adapted to hinge thereon in a line lying parallel to the plane of the tire, an integrally formed broad hook at one end of each link engaging the end of an adjacent link and adapted to have a hinging action relatively in a line extending transversely of the tire, the links having grooves extending parallel to the plane of the tire and also having grooves extending laterally with respect to the same communicating with the open portions of the links, the former to permit the members and links to be interengaged, the latter to permit adjacent links to be interengaged.

3. A protector for a tire, comprising in combination, a series of members having abutting edges, each outer edge of each member having a hook extending outwardly, downwardly and inwardly toward the tire and each hook being less in length than the edge from which it extends and disposed substantially at the middle of the length of said edge, a link at each side of the member engaging the hook of said member and itself having a hook at one end adapted to engage an adjacent link and arranged to have movement relatively thereto in line with the abutting edges of two of the members, each of said links having a laterally disposed groove for admitting the hook of an adjacent link, the links maintaining the abutting relation of the members.

In testimony whereof I affix my signature, in presence of two witnesses.

GUSTAVE KARL.

Witnesses:
L. M. THURLOW,
VINNIE V. CARLEY.

Copies of this patent may be obtained for five cents each, by addressing the "Commissioner of Patents, Washington, D. C."